US007708808B1

(12) United States Patent  (10) Patent No.: US 7,708,808 B1
Heumann  (45) Date of Patent: May 4, 2010

(54) CYCLONE SEPARATOR WITH ROTATING COLLECTION CHAMBER

(75) Inventor: William L. Heumann, Prospect, KY (US)

(73) Assignee: Fisher-Klosterman, Inc., Louisville, KY (US)

( * ) Notice: Subject to any disclaimer, the term of this patent is extended or adjusted under 35 U.S.C. 154(b) by 502 days.

(21) Appl. No.: 11/756,953

(22) Filed: Jun. 1, 2007

(51) Int. Cl.
*B01D 45/12* (2006.01)

(52) U.S. Cl. .............................. 95/271; 55/401; 55/428; 55/430; 55/432; 55/466; 55/400; 55/406; 55/459.1; 95/270

(58) Field of Classification Search .................. 55/401, 55/428, 430, 432, 466, 400, 406, 459.1; 95/271, 95/270
See application file for complete search history.

(56) References Cited

U.S. PATENT DOCUMENTS

| 1,170,438 | A |   | 2/1916  | Fahmey |
| 2,911,730 | A |   | 11/1959 | Schaub et al. |
| 3,219,394 | A | * | 11/1965 | Moss et al. .................. 406/171 |
| 3,373,874 | A |   | 3/1968  | Kompert |
| 3,419,152 | A |   | 12/1968 | Ramond |
| 3,535,854 | A | * | 10/1970 | Taylor .......................... 55/338 |
| 4,073,644 | A |   | 2/1978  | Papafingos et al. |
| 4,201,557 | A | * | 5/1980  | Petersen ....................... 55/327 |
| 4,230,581 | A |   | 10/1980 | Beazley |
| 4,339,312 | A |   | 7/1982  | Brooks et al. |
| 4,994,097 | A | * | 2/1991  | Brouwers ..................... 55/317 |
| 5,123,945 | A |   | 6/1992  | Lin |
| 5,332,501 | A |   | 7/1994  | Mangialardi |
| 5,788,728 | A |   | 8/1998  | Solis et al. |
| 5,858,038 | A |   | 1/1999  | Dyson et al. |
| 6,193,787 | B1| * | 2/2001  | Dyson et al. .................. 95/271 |
| 6,228,151 | B1|   | 5/2001  | Conrad et al. |
| 6,818,034 | B2|   | 11/2004 | Anderson et al. |
| 2006/0196154 | A1 | * | 9/2006 | Benedictus et al. ........... 55/337 |
| 2006/0230722 | A1 | * | 10/2006 | Oh et al. ........................ 55/345 |
| 2008/0264016 | A1 | * | 10/2008 | Oh et al. ........................ 55/429 |

FOREIGN PATENT DOCUMENTS

DE  19621936  12/1997
GB  2284165   5/1995

* cited by examiner

*Primary Examiner*—Jason M Greene
*Assistant Examiner*—Dung Bui
(74) *Attorney, Agent, or Firm*—Camoriano and Associates; Theresa Fritz Camoriano

(57) ABSTRACT

A cyclone separator including a gas inlet, a gas outlet, and a particle outlet opening, wherein a rotatable particle collection chamber is in fluid communication with the particle outlet opening.

7 Claims, 4 Drawing Sheets

CYCLONE SEPARATOR WITH ROTATING COLLECTION CHAMBER

BACKGROUND

The present invention relates to a cyclone separator. More particularly, it relates to a cyclone separator which includes a rotating collection chamber for collecting the solid particles that exit the bottom of the cyclone separator.

It is well known that many, if not most, particles that escape from a cyclone have been effectively separated from the gas stream, fall to the bottom of the separator, and then are re-entrained in the gas stream.

SUMMARY

The present invention provides a rotating collection chamber for collecting the solid particles that are separated from the gas stream in the cyclone separator. The centrifugal force imparted on the particles by the rotating chamber throws the particles to the outside of the chamber, further separating them from the gas stream, and thereby greatly reducing re-entrainment of the particles.

In addition, rotating the collection chamber in the same direction in which the gas is rotating in the cyclone improves the gas flow patterns, which further improves the collection efficiency.

DESCRIPTION

Figure 1:
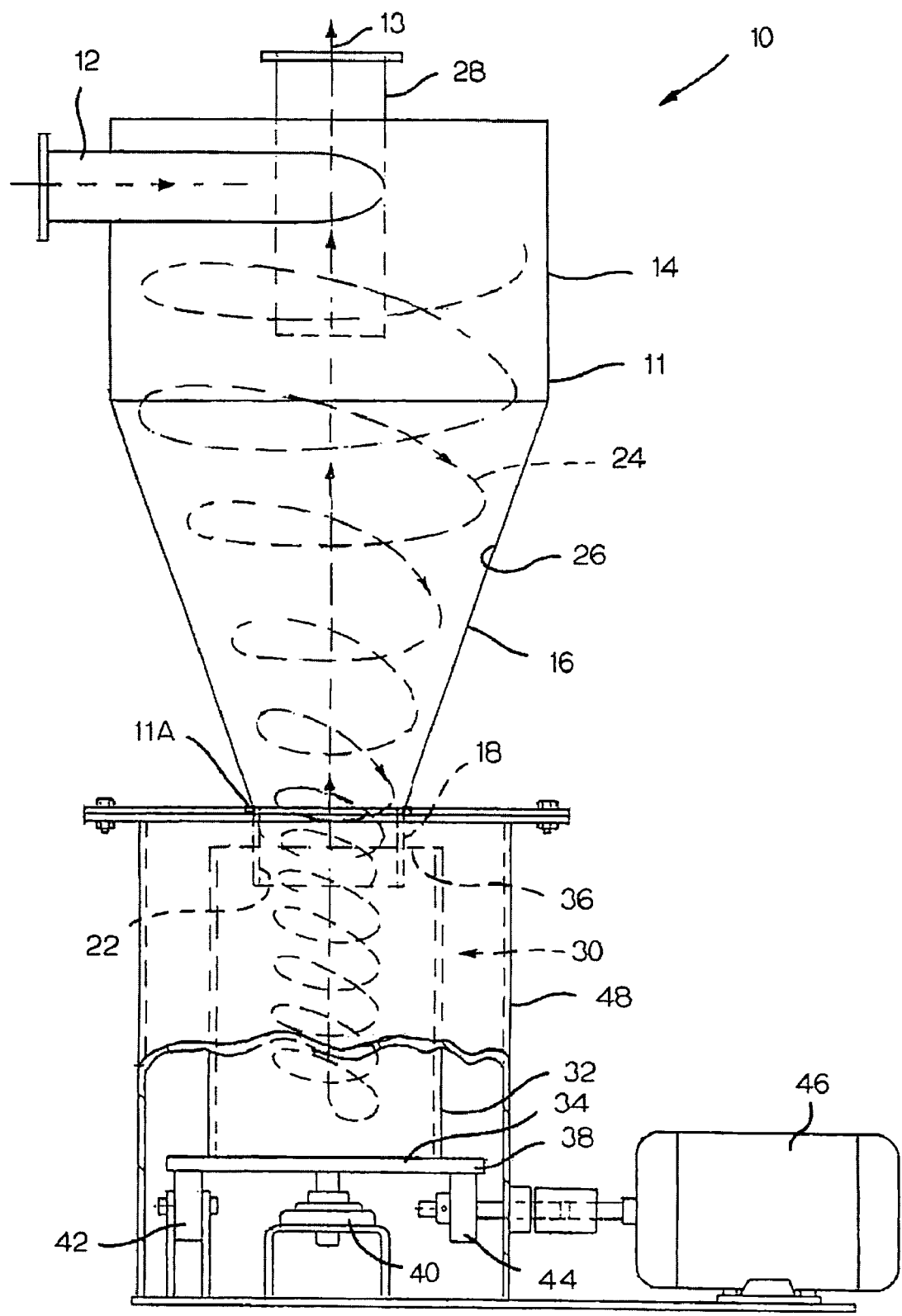
FIG. 1 is a side view, partially broken away, of a cyclone separator with a rotating collection chamber made in accordance with the present invention, with the flow path of the gas inside the cyclone shown in phantom.
Figure 2:
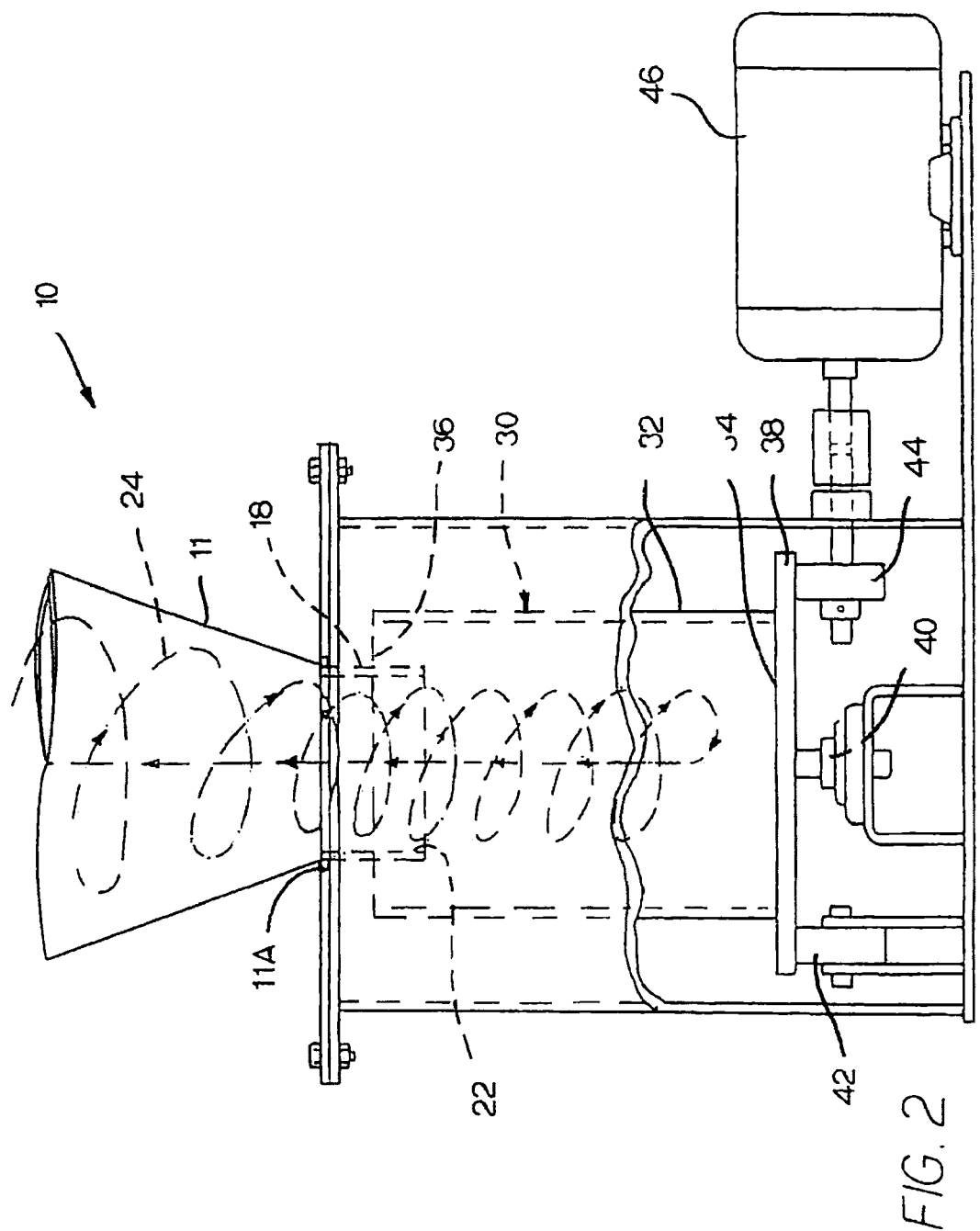
FIG. 2 is an enlarged view of the bottom portion of FIG. 1, showing the rotating collection chamber inside a protective housing.

FIGS. 1 and 2 show an example of a cyclone separator 10 made in accordance with the present invention. The cyclone separator 10 has a continuous side wall 11, which has a substantially circular cross-section and defines a central vertical axis 13. The side wall 11 defines a tangential inlet 12 to allow a particulate laden gas, such as air, to enter the body of the cyclone separator 10. The side wall 11 of the cyclone separator 10 includes an upper cylindrical section 14, an intermediate frustroconical section 16 (hereinafter referred to simply as the conical section 16), and a lower cylindrical section 18, so the cyclone tapers from a larger diameter on top to a smaller diameter at the bottom. A circular, solids outlet opening 22 is located at the bottom of the lower cylindrical section 18. A cylindrical, clean-gas-outlet 28 is located at the top of the cyclone separator 10. Typically, particulate laden gas is drawn into and through the cyclone separator 10 by a fan (not shown) located downstream of the cyclone separator 10 and connected to the outlet 28.

As the particulate laden gas enters the cyclone separator 10 through the tangential inlet 12, a swirling action (or vortex) is induced in the gas. As more gas enters the cyclone separator 10, it displaces the gas already in the cyclone separator 10, causing it to move downwardly along the inside surface 26 of the side wall 11 of the conical section 16. This creates a downwardly spiraling vortex 24. As the cross-sectional area of the conical section 16 decreases, the velocity of the gas flow increases, and the centrifugal forces acting on the dust particles carried by the gas flow force these particles against the inside surface 26 of the conical section 16. These dust particles fall down along the inside surface 26, and, in a properly sized and designed cyclone separator 10, these dust particles fall into the cylindrical section 18 and exit the cyclone separator 10 through the solids outlet opening 22, while the clean gas makes a sharp change in direction and flows upwardly along the central axis 13 of the cyclone separator 10 and out through the outlet 28.

Referring now to FIGS. 1 and 2, just below the solids outlet opening 22 of the cyclone separator 10 is a cylindrically-shaped particle collection chamber 30, including a sidewall 32 and a closed bottom 34, and defining a top opening 36. The lower cylindrical section 18 of the cyclone separator 10 extends through this top opening 36, as shown in FIG. 2. The inside diameter of the collection chamber 30 is larger than the outside diameter of the solids outlet opening 22 at the bottom end of the lower cylindrical section 18 of the cyclone separator 10. The height of the collection chamber 30 preferably is at least as great as the inside diameter of the solids outlet opening 22.

The collection chamber 30 rests on top of a platform 38, which is supported for rotation by the pillow block bearing 40, idler roller 42, and drive roller 44, which is driven by a motor 46. The entire collecting chamber 30 with its corresponding rotational support mechanism (including the pillow block 40, and the idler and drive rollers 42, 44 respectively) is housed in an airtight, non-rotating enclosure 48, which is sealed against the cyclone wall 11 by means of a gasket 11A. This means that the gas that is flowing downwardly cannot escape out the enclosure 48 and so must turn around and flow upwardly through the center of the cyclone to the gas outlet 28 in order to exit.

Figure 3:
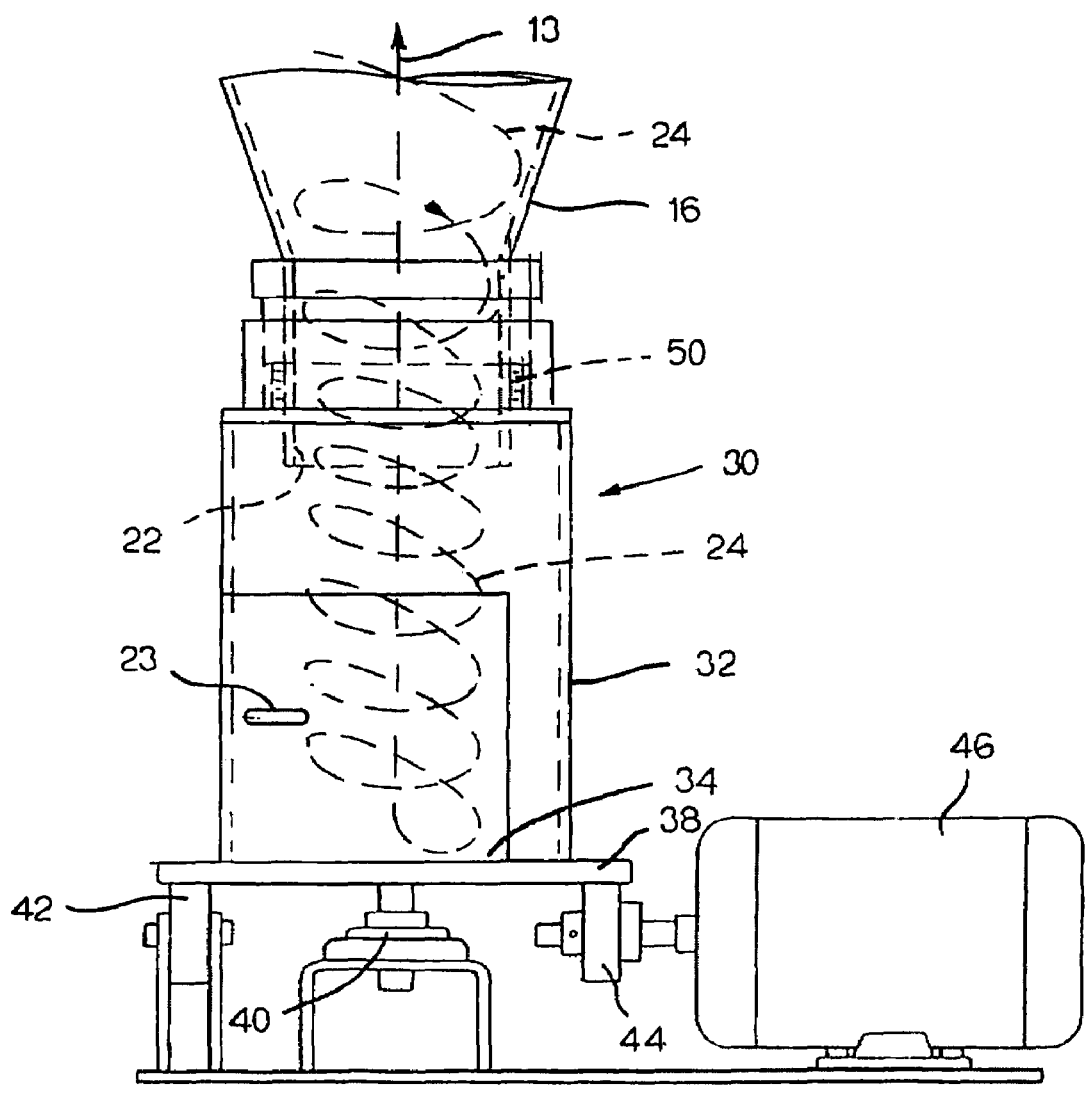
FIG. 3 is similar to FIG. 2 except the rotating collection chamber is not enclosed in a protective housing and has a clean-out door for removing the particles.

Since the enclosure 48 is an airtight enclosure, it is not necessary to provide an airtight seal at the joint between the rotating collection chamber 30 and the fixed lower cylindrical section 18 of the cyclone separator 10. Alternatively, as shown in FIG. 3, if there is no airtight enclosure present, the junction between the rotating collection chamber 30 and the fixed lower cylindrical section 18 is sealed by means of a seal 50, which, in this embodiment, is fixed to and rotates with the collection chamber 30. The seal 50 could, alternatively, be fixed to the cyclone 11. A wide variety of seal designs may be used for this purpose, as is well-known in the industry. Of course, a seal 50 may be used even when an airtight enclosure 48 is present, if desired.

During operation, particle laden gas enters the cyclone separator 10 at the tangential gas inlet 12, inducing a clockwise vortex 24 (as seen from the top of the FIG. 1). The swirling gas flow gathers speed as it advances down through the frustroconical portion 16 of the cyclone separator 10, until it reaches the lower cylindrical section 18 and flows into the rotating collection chamber 30 through the solids outlet opening 22. The gas flow then experiences a sharp change in direction as it reaches the closed bottom 34 of the collection chamber 30, and then flows upwardly along the vertical axis 13 of the cyclone separator 10 and exits through the gas outlet 28.

Most of the particles that were in the particle-laden gas stream that entered the inlet 12 are separated out by centrifugal force and fall down along the inside of the cyclone wall 11 into the particle collection chamber 30, where they are flung against the outer wall 32 of the collection chamber 30, away from the swirling gas stream 24, so they are not re-entrained into the gas stream 24. Any particles which are still in the swirling gas stream 24 flow into the collection chamber 30. The denser particles are immediately flung against the rotating cylindrical wall 32 of the collection chamber 30, where they are trapped by the centrifugal force pushing them against the wall 32. Less dense particles may continue to travel downwardly with the gas stream 24 inside the collection chamber 30 until the gas flow makes an abrupt change in direction as it reaches the rotating bottom surface 34 of the collection chamber 30. Any particles which are unable to make this abrupt change in direction impinge upon the rotating surface 34, where they too are flung outwardly against the rotating cylindrical wall 32 of the collection chamber 30. Any particles which are flung against the rotating cylindrical wall 32 of the collection chamber 30 remain trapped there, because the rotating action of the collection chamber 30 imparts a centrifugal force on those particles.

Once the collection chamber 30 is sufficiently filled with particles, the particles may be removed. In the embodiment shown in FIG. 3, the cyclone separator 10 is shut down, the collection chamber 30 is stopped from further rotation, and a door 23 is opened, in order to allow access to the inside of the collection chamber 30 to remove the particles.

Alternatively, in the embodiment of FIGS. 1 and 2, the cyclone separator 10 is shut down, the rotation of the platform 38 is stopped, and the collection chamber 30 is removed from the bottom of the cyclone separator 10. In that case, the collection chamber 30 may be disposed of and replaced with a new collection chamber 30, or it may be emptied and then re-installed.

Figure 4:
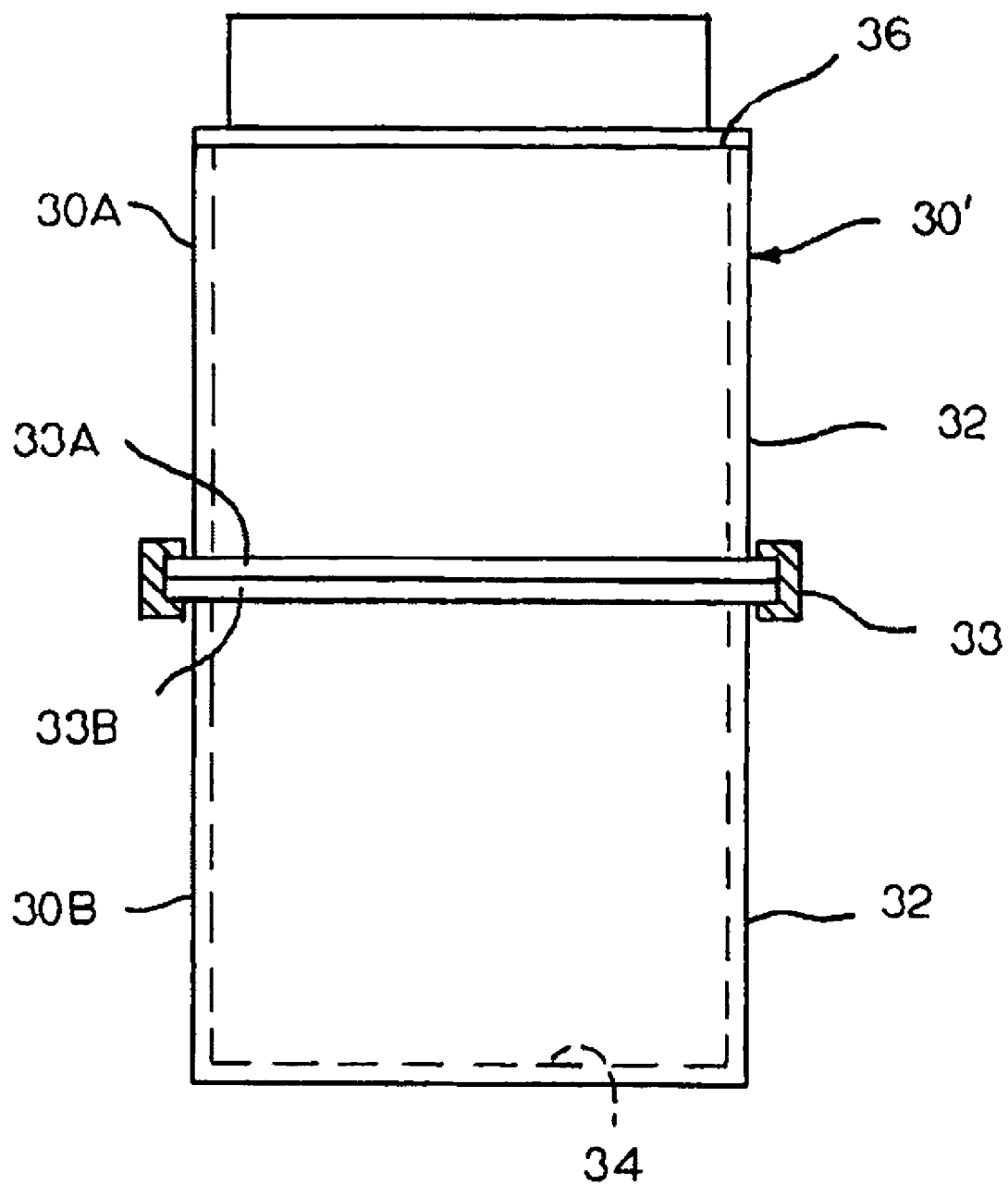
FIG. 4 is a view of an easily removable collection chamber for use in the embodiment of FIG. 1.

FIG. 4 shows an example of a collection chamber 30' that would be readily removable. This chamber 30' is made of two parts 30A, 30B, which have opposed circular flanges 33A, 33B that are clamped together by a clamp 33. In order to remove the collection chamber 30', the clamp 33 is released, and the lower part 30B, which holds the particulates, is removed. The lower part 30B may then be emptied and re-installed, again clamping it to the upper part 30A, or a new lower part 30B may be installed. Of course, various other arrangements that allow for easy removal of the collection chamber 30 could be used instead.

It will be obvious to those skilled in the art that modifications may be made to the embodiments described above without departing from the scope of the present invention.

What is claimed is:

1. A separator for separating particles from a particle laden gas stream, comprising:
    a cyclone body wall having a top and a bottom and defining a central vertical axis, with said cyclone body wall having a larger first radius at the top and tapering to a smaller second radius at the bottom, said cyclone body wall defining a gas inlet, a gas outlet opening at the top, and a particle outlet opening at the bottom, wherein said gas outlet opening and particle outlet opening are substantially aligned with said central vertical axis;
    a particle collection chamber beneath said particle outlet opening, said particle collection chamber having a closed bottom and defining a top opening in fluid communication with said particle outlet opening;
    means for rotating said particle collection chamber about said vertical axis relative to said cyclone;
    means for removing separated solid particles from said particle collection chamber; and
    means for providing a substantially airtight seal around said particle outlet opening to ensure that gas entering through the cyclone gas inlet exits through said gas outlet opening.

2. A separator for separating particles from a particle laden gas stream as recited in claim 1, wherein said gas inlet is tangential to said cyclone body wall and defines an induced direction of rotation to a gas stream entering said cyclone body, and wherein said means for rotating said particle collection chamber includes means for rotating the particle collection chamber in said induced direction.

3. A separator for separating particles from a particle laden gas stream as recited in claim 1, wherein said means for providing an airtight seal includes a sealed containment chamber enclosing said particle collection chamber.

4. A method for separating solid particles from a particle laden gas stream, comprising the steps of:
    flowing a particle laden gas stream tangentially into a cyclone separator having an upper gas outlet and a lower particle outlet to separate the particles from the gas stream;
    providing a collection chamber in fluid communication with said lower particle outlet;
    rotating said collection chamber about a central vertical axis relative to said separator; and
    trapping the separated particles inside said collection chamber while allowing the gas stream to exit through the upper gas outlet.

5. A method for separating solid particles from a particle laden gas stream as recited in claim 4, and further comprising the steps of stopping the rotation of said collection chamber and removing said collection chamber from the lower particle outlet of said separator to remove the trapped particles.

6. A method for separating solid particles from a particle laden gas stream as recited in claim 4, and further comprising the steps of stopping the rotation of said collection chamber and opening a clean-out door in said collection chamber to remove the trapped particles.

7. A method for separating solid particles from a particle laden gas stream as recited in claim 4, and further comprising the step of adjusting the rate of rotation of the collection chamber depending on the operating conditions.

* * * * *